No. 671,485. Patented Apr. 9, 1901.
A. JOHNSTON.
LAWN SPRINKLER.
(Application filed Nov. 23, 1900.)
(No Model.)
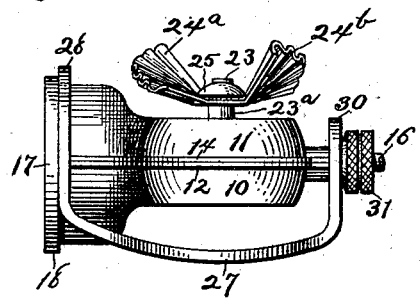
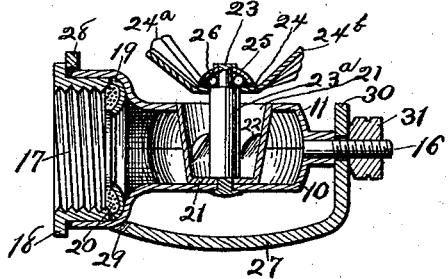
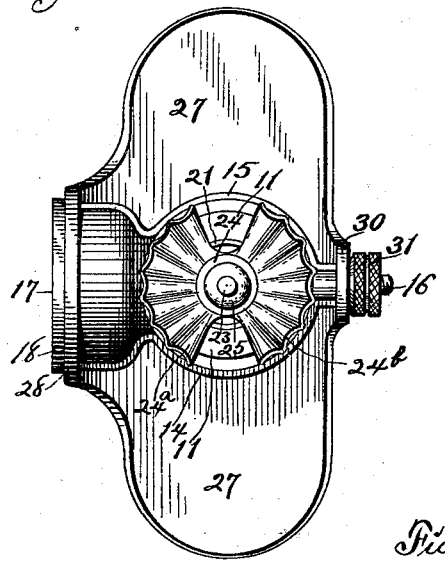
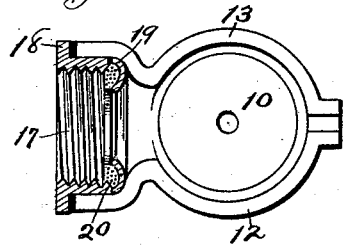
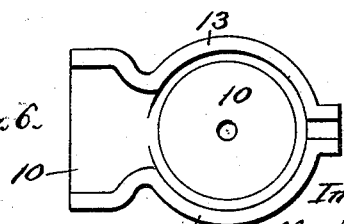
Witnesses
Charles F. Wilcox.
W. E. Ellis.
Inventor:
Allen Johnston,
By Hedwith
Atty

UNITED STATES PATENT OFFICE.

ALLEN JOHNSTON, OF OTTUMWA, IOWA.

LAWN-SPRINKLER.

SPECIFICATION forming part of Letters Patent No. 671,485, dated April 9, 1901.

Application filed November 23, 1900. Serial No. 37,433. (No model.)

*To all whom it may concern:*

Be it known that I, ALLEN JOHNSTON, a citizen of the United States of America, and a resident of Ottumwa, Wapello county, Iowa, have invented certain new and useful Improvements in Lawn-Sprinklers, of which the following is a specification.

The object of this invention is to provide an improved construction for lawn-sprinklers susceptible of producing in use a rose-spray and distributing a small amount of water over a large area and also susceptible of construction at a minimum cost.

My invention consists of the construction, arrangement, and combination of elements hereinafter set forth, pointed out in my claims, and illustrated by the accompanying drawings, in which—

Figure 1 is a side elevation of the complete device. Fig. 2 is a transverse section of the complete device. Fig. 3 is a plan of the complete device. Fig. 4 is a detail elevation of the torsion-chamber detached from the device. Fig. 5 is a horizontal section of the device, the sled, torsion-chamber, spindle, supporting screw, and nut being detached. Fig. 6 is a plan of one member of the casing of the device.

In the construction of the device as shown the numeral 10 designates one member, and 11 the other member, of a sprinkler-casing, both of which are struck up or stamped from imperforate pieces of sheet metal into concavo-convex form, alike in dimension and contour. The members 10 11 of the casing are formed with flanges 12 13 14 15 extending outwardly from their side edges and plane in respect of their outermost and innermost faces and curved in respect of the said margins of the members. The members 10 11 are assembled with their concaved faces inwardly and their flanges in contact with each other in pairs and are connected by soldering, brazing, or otherwise hermetically sealing the contacting faces thereof together, thus producing a chamber or complete casing having a barrel-shaped central body, a cylindrical initial chamber connected to the barrel-shaped central body by a reducing conical neck, and a stem having a central bore for the admission of the supporting-screw 16. The diameter of the barrel-shaped central portion of the casing is at right angles to the diameter of the cylindrical initial chamber and of slightly-greater dimension. By forming the casing of two members struck up or stamped from sheet metal I am enabled to produce a water-chamber at a minimum cost and one in which both the inner and outer surfaces are smooth as contradistinguished to a water-chamber made of metal by casting and in which the inner surface is, of necessity, rough and uneven. A collar 17, which may either be cast or formed of sheet metal by spinning and provided with an internal screw-thread and an external peripheral flange 18, is mounted in the cylindrical initial water-chamber of the casing and brazed or otherwise rigidly secured thereto. A washer 19, of annular form and concavo-convex in cross-section, is mounted in the cylindrical initial water-chamber of the casing, with its convex face in contact with the inner face of the neck of the casing, and is held in place by engagement of the outer end of the collar 17 with its outermost edge. It is immaterial whether or not the washer 19 is held rigidly in the casing, inasmuch as a flexible gasket 20, of annular form, is mounted in the concavity of said washer and serves to seal against leakage of water through the collar when a hose-coupling (not shown) is screwed into said collar and impinges at its inner end against and compresses said gasket. A torsion-chamber 21, in form approximating to a truncated cone with an end piece formed at the apex thereof, is produced by stamping from an imperforate piece of sheet metal or by spinning. The torsion-chamber 21 is provided with spirally-arranged slots 22, four, five, or six in number, in the central and lower portion of its side, and the metal on one side of each slot is bent inwardly, as shown in Figs. 2 and 4, to provide a vent or passage-way for water without carrying away any of the material. A small aperture is formed in the center of the end piece of the torsion-chamber 21, and a similar aperture is formed in the center of the plane end of the barrel-shaped portion of the member 10. A larger opening, corresponding in diameter with the exterior diameter of the larger end of the torsion-chamber 21, is formed in the center of the plane end of the barrel-shaped portion of the member 11, and the torsion-chamber is mounted through said larger opening and extends within the casing to such an extent that its closed end contacts with the upper surface of the plane portion of the member 10, and the aperture in said closed end registers with the small aperture in the center of said member 10. The larger end portion of the torsion-chamber 21 is brazed or otherwise hermetically sealed to the plane portion of the member 10, and the only means of water communication between the interior of the casing and the interior of said torsion-chamber is through spiral slots 22. A spindle 23 is provided and formed circular in cross-section. The spindle 23 is mounted in the center of the torsion-chamber 21, with one of its end portions extending through the registering apertures of the torsion-chamber and the member 10 and riveted upon and hermetically sealed to the outer surface of the plane portion of said member. The opposite end portion of the spindle 23 extends beyond the larger end of the torsion-chamber 21, and a sleeve 23$^a$ is mounted loosely for revolution on the spindle. A cap 24 is mounted rigidly on the outer end of the sleeve and rotates therewith. The rotating cap 24 is formed of sheet metal by stamping and comprises a hub, plane transversely, and wing portions 24$^a$ 24$^b$, extending from diametrically opposite portions of the hub. The wing portions 24$^a$ 24$^b$ are corrugated or serrated and are of such length as to extend radially from the hub and materially overlap the periphery of the torsion-chamber 21 and are bent out of the transverse plane of the hub. Furthermore, the wing portions 24$^a$ 24$^b$ are set spirally relative to the hub and to each other, as illustrated in Figs. 1 and 2. A concavo-convex washer 25 is mounted on the extreme outer end portion of the spindle 23, and the extremity of said spindle is riveted outside the washer. The concaved face of the washer 25 faces the outer plane surface of the hub of the rotating cap, and balls 26 are interposed between said concaved face and the hub. Thus the hub of the rotating cap is supported by mounting on the outer end of the sleeve 23$^a$ and by its other face contacting with the balls 26, held in place by the concavo-convex washer 25, the washer in turn being retained by engagement of the riveted end of the spindle. A sled or base 27 is provided and formed of sheet metal by stamping. This sled or base preferably is oval in general contour and concavo-convex transversely or on its shorter diameter. An ear 28 is formed on and projects radially from one side margin of the sled or base 27 and is turned at an obtuse angle relative to the major portion of said sled and perforated or formed with an opening 29 of such diameter as to receive the cylindrical initial portion of the sled-casing. An ear 30 is formed on the side margin of the sled or base 27, diametrically opposite to the ear 28, and is bent at an obtuse angle to the major portion of said sled into a plane parallel with the plane of the other ear. The ear 30 is formed with an aperture registering with the aperture 29, but of smaller diameter than the aperture 29, and the casing is mounted on the sled by traversing the aperture 29 and inserting the supporting-screw 16 through said aperture in the ear 30. The casing is so mounted that the peripheral flange 18 of the collar 17 abuts the ear 28, and a nut 31 is mounted on the screw 16 and abuts the outer surface of the ear 30 and rigidly locks the casing in the sled or base. The aperture 29 is of such size relative to the ear in which it is formed as to extend somewhat into the base or sled, and one diameter thereof is curved. Thus is provision made for inserting the casing by a movement from right to left, the flange 18 passing through the aperture 29. By this means I am enabled to complete the sprinkler before mounting the same on the sled or base. After passing the flange 18 through the aperture 29 by a movement of the casing from right to left I move the casing from left to right to insert the supporting-screw 16 in the aperture of the ear 30.

In practical use a hose-coupling is screwed into the collar 17 and water introduced to the casing. The water flows under pressure from the casing through the spiral slots 22 of the torsion-chamber 21 and is given a spiral or torsional direction of movement by passage through said slots. The water flows or jets from the torsion-chamber 21 against the wing portions 24$^a$ 24$^b$ of the rotating cap and sets up a movement of revolution of said cap on its bearings. The direction of revolution of the cap is determined partly by the spiral currents or jets of water and partly by the torsional or spiral positions of the wing portions relative to the hub and to each other. Owing to the corrugations of the wing portions 24$^a$ 24$^b$ of the rotating cap the jets of water from the torsion-chamber are subdivided and directed outwardly radially or at a tangent from the cap. The result of the subdividing of the jets or streams of water in conjunction with the revolution of the cap rapidly under pressure the water is broken up into drops simulating rain to a remarkable degree. Another effect of the torsional or spiral position of the wing portions relative to the hub and to each other is to distribute the spray of water over unequal areas, the drops directed by the corrugations of higher altitude being thrown a greater distance from the axis of the cap than the drops directed by the corrugations of lower altitude. A portion of the jets or streams of water from the torsion-chamber is engaged and deflected by the hub of the rotating cap and falls adjacent to the sprinkler. Thus a considerable area of ground-surface is brought under the influence of the rain or spray, and the quantity deposited throughout this area of distribution is for all practical purposes uniform and unvarying, save as the pressure of the water introduced to the sprinkler may vary.

The complete device may be drawn from place to place on a lawn or other surface desired to be sprinkled by manual force applied to the hose at a safe distance from the sprinkler, inasmuch as the device is carried by the sled traveling freely over such surfaces. By the interposition of balls between the rotating cap and the concavo-convex washer 25 I reduce to a minimum the friction between said washer and cap occasioned by the outward pressure of the water on the inner surface of the cap and its wings.

The casing may be adjusted level in the sled to discharge a spray upwardly equally on all sides, or it may be tilted in its seats in the ears 28 30 in either direction to throw a spray straight up on one side only and into the sled on the other side or in any intermediate position. Thus may the device be utilized to spray away from a wall or walk or toward a particular object.

I claim as my invention—

1. In a lawn-sprinkler a casing member stamped from sheet metal and comprising an initial water-chamber, a central portion plane at its end, a marginal flange on its side edges and a stem portion diametrically opposite the initial water-chamber.

2. In a lawn-sprinkler, a casing formed of sheet metal and comprising counterpart plates made by stamping, each plate being composed of an initial semicylindrical portion, a semiconical neck portion, a semicylindrical central portion, having a plane end and a semicylindrical stem portion, together with marginal flanges on its long side edges.

3. In a lawn-sprinkler, a casing composed of two members, stamped from sheet metal, rigidly connected and, when connected, comprising a cylindrical initial portion, a conical neck, a barrel-shaped body portion having plane ends, a cylindrical stem portion and flanges at the points of juncture.

4. In a lawn-sprinkler, a casing made of two members stamped in sheet metal and comprising a cylindrical initial portion, a conical neck portion, a barrel-shaped body portion having plane ends, a cylindrical stem portion, a flange at the points of juncture, in combination with a collar within the cylindrical initial portion, a spraying device adjacent the barrel-shaped portion and communicating therewith and the sled on which the casing is removably and replaceably mounted.

5. In a lawn-sprinkler, the combination of the casing stamped in sheet metal, the torsion-chamber in and leading from said casing and formed with spiral slots in its side, the rotating cap communicating with said torsion-chamber and means for introducing water under pressure to said casing.

6. In a lawn-sprinkler, the combination of the casing, the torsion-chamber therein and opening therefrom, the rotating cap communicating with the open end of the torsion-chamber and corrugated wings formed on said cap and radially thereof.

7. In a lawn-sprinkler, the combination of the casing, the torsion-chamber therewith, the spindle in the center of said torsion-chamber, the cap formed with corrugated radiating wings and mounted for revolution on said spindle and spaced apart from and overlapping the periphery of the torsion-chamber and means for introducing water under pressure to said casing.

8. In a lawn-sprinkler, the combination of the two-part casing rigidly connected, means for attaching said casing to a hose-coupling, the chamber in said casing and communicating therewith through slots and open at one end and the rotating cap mounted at and overlapping the open end of said chamber.

9. In a lawn-sprinkler, the combination of the casing, means for attaching said casing to a hose, the chamber in said casing and shaped as a truncated cone having its open end outward and serving as a discharge-port, the spindle mounted in said chamber and fixed to the casing, the cap mounted for revolution on said spindle, the washer on said spindle and the balls interposed between said washer and cap.

10. In a lawn-sprinkler, the torsion-chamber formed with spiral slots, the spindle in said chamber, the sleeve on said spindle, the cap mounted on said sleeve for revolution on said spindle and overlapping an open end of the chamber and means for forcing water through the slots of the chamber toward said cap.

11. In a lawn-sprinkler, the combination of the sled-base having the ears formed thereon opposite each other and apertured, the casing mounted in the apertures of the ears, means for fastening said casing to said ears, and a sprinkler device carried by said casing.

12. In a lawn-sprinkler, the combination of the casing, the annular washer concavo-convex in cross-section mounted transversely of said casing, the collar mounted in said casing and confining the said washer, the gasket within the concave of said washer and the sprinkling device mounted on and communicating with said casing.

13. In a lawn-sprinkler, the combination of the casing, the sled formed with ears apertured to receive said casing, the collar on said casing, the flange on said collar abutting one of said ears, the supporting-screw in said casing traversing the other ear of the sled, the nut on said screw abutting the outer surface of said ear in opposition to the flange of the collar, and a sprinkling device mounted on and communicating with said casing.

14. In a lawn-sprinkler, the combination of the casing having an opening in one side thereof through which water may flow, the spindle mounted in said opening and fixed to the casing, the cap mounted for revolution on said spindle and wings on said cap and radiating therefrom, which wings are corrugated and set torsionally relative to the cap and to each other.

15. In a lawn-sprinkler, the combination of the casing having an opening in one side thereof through which water may flow, the spindle mounted in said opening, and fixed to the casing, the cap mounted for revolution on said spindle and wings on said cap and radiating therefrom, which wings are corrugated and set torsionally relative to the cap and to each other, together with a concavo-convex washer on the extremity of the spindle and balls interposed between said washer and the cap.

16. In a lawn-sprinkler, the combination of the casing having an opening in one side, the torsion-chamber formed as a truncated cone with its smaller end closed and mounted through said opening of the casing, the closed smaller end of the torsion-chamber contacting with the opposite side of the casing, the spindle mounted on and connecting the torsion-chamber and casing and the cap mounted for revolution on said spindle, the side of the torsion-chamber being formed with slots affording communication with the casing.

17. In a sprinkling device, the chamber formed of sheet metal by stamping and shaped as a truncated cone its smaller end closed and its side pierced by slots arranged spirally and so shaped that the water entering through said slots will receive a spiral direction.

18. In a sprinkling device, a rotating cap formed of sheet metal by stamping and comprising a hub and radial wings thereon, which wings are corrugated radially.

19. In a sprinkling device, a rotating cap made of sheet metal by stamping and comprising a hub and wings on and radially of said hub, which wings are corrugated radially and set torsionally relative to the hub and to each other.

20. In a sprinkling device, the rotating cap formed of sheet metal by stamping, and wings radially of said hub and bent out of the transverse plane thereof, which wings are corrugated radially and set torsionally relative to the hub and to each other.

Signed at Ottumwa, Iowa, this 8th day of October, 1900.

ALLEN JOHNSTON.

Witnesses:
DAVID H. KINCAID,
FRANK B. CLARK.